(12) United States Patent
Shiina et al.

(10) Patent No.: US 11,803,289 B2
(45) Date of Patent: Oct. 31, 2023

(54) ICON DISPLAY CONTROLLING DEVICE AND COMPUTER-READABLE MEDIUM FOR CONTROLLING ICON DISPLAY

(71) Applicant: Faurecia Clarion Electronics Co., Ltd., Saitama (JP)

(72) Inventors: Azusa Shiina, Saitama (JP); Yuki Matsushita, Saitama (JP); Jun Sakura, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 18/071,274

(22) Filed: Nov. 29, 2022

(65) Prior Publication Data

US 2023/0168790 A1 Jun. 1, 2023

(30) Foreign Application Priority Data

Nov. 30, 2021 (JP) .................................. 2021-193788

(51) Int. Cl.
*G06F 3/04817* (2022.01)
*G06F 3/04845* (2022.01)

(52) U.S. Cl.
CPC ...... *G06F 3/04817* (2013.01); *G06F 3/04845* (2013.01)

(58) Field of Classification Search
CPC .......................... G06F 3/04817; G06F 3/04845
See application file for complete search history.

(56) References Cited

U.S. PATENT DOCUMENTS

| 2002/0160817 | A1* | 10/2002 | Salmimaa ........... G06F 3/04817 455/457 |
| 2003/0098892 | A1* | 5/2003 | Hiipakka .............. G06F 3/0481 715/846 |
| 2003/0142125 | A1* | 7/2003 | Salmimaa ......... H04M 1/72454 715/733 |
| 2007/0157089 | A1 | 7/2007 | Van Os et al. |

(Continued)

FOREIGN PATENT DOCUMENTS

JP 2015-215650 A 12/2015

OTHER PUBLICATIONS

Unpublished JP Application No. 2021-178168 filed Oct. 29, 2021 with English translation.

(Continued)

*Primary Examiner* — Mong-Shune Chung
(74) *Attorney, Agent, or Firm* — FOLEY & LARDNER LLP

(57) ABSTRACT

An icon display controlling device includes a priority level setting unit that sets priority levels for each of a plurality of regions partitioned within a display area that can display a plurality of icons each having a display size, the plurality of icons including a first icon having a first display size and a second icon having a second display size that is larger than the first display size of the first icon; a display reducing unit that reduces the second display size of the second icon that is located in the display area, based on at least one of the priority levels; and an icon placing unit that places an additional icon into a vacated region of the plurality of regions within the display area that has been vacated through reducing the display size of the second icon.

6 Claims, 8 Drawing Sheets

(56) References Cited

U.S. PATENT DOCUMENTS

| | | | |
|---|---|---|---|
| 2011/0191611 A1* | 8/2011 | boni ang gaw go | ........................ G06F 3/04817 713/320 |
| 2014/0013271 A1* | 1/2014 | Moore | ................ G06F 3/04883 715/792 |
| 2015/0324093 A1 | 11/2015 | Wada et al. | |
| 2021/0011618 A1* | 1/2021 | Feit | ........................ B60K 35/00 |

OTHER PUBLICATIONS

Unpublished JP Application No. 2021-178169 filed Oct. 29, 2021 with English translation.

\* cited by examiner

ICON DISPLAY CONTROLLING DEVICE AND COMPUTER-READABLE MEDIUM FOR CONTROLLING ICON DISPLAY

CROSS-REFERENCE TO RELATED PATENT APPLICATION

This application claims the benefit of and priority to Japanese Patent Application No. 2021-193788, filed on Nov. 30, 2021, the entire disclosure of which is hereby incorporated by reference herein.

FIELD OF TECHNOLOGY

The present disclosure relates to an icon display controlling device and icon display controlling program.

BACKGROUND

There are known icon display controlling devices that are able to place a plurality of icons within a predetermined display area, for example, as disclosed in Japanese Patent Application Publication No. 2015-215650 ("Patent Document 1"). In this type of icon display controlling device, a case in which a new icon is added and placed in the display area is considered. In this case, if there is no space to add a new icon in the display area, it is necessary to secure the space through the user deleting one of the icons that is located in the display area.

SUMMARY

In such a case, it is necessary for the user to perform an operation to transit to a mode for deleting the icon, an operation to delete the icon, an operation to transit to a mode to add a new icon, an operation to add the new icon, and the like. It has been pointed out that there is a problem with usability due to the need for such complex operations.

In contemplation of the situation set forth above, an object of the present disclosure is to provide an icon display controlling device and icon display controlling program that make it possible to improve the usability when adding and placing an icon in a display area.

An icon display controlling device according to one aspect of the present disclosure includes: a priority level setting unit for setting priority levels for each of a plurality of regions partitioned within a display area that can display a plurality of icons that have different display sizes, including a first icon, and a second icon of a display size that is larger than that of the first icon; a display reducing unit for reducing a display size of at least one second icon that is located in the display area, based on the priority level; and an icon placing unit for placing an additional icon into the region within the display area vacated through reducing the display size of the second icon.

The icon display controlling device and icon display controlling program according to one embodiment enables an improvement in usability when adding and placing an icon into a display area.

BRIEF DESCRIPTIONS OF THE FIGURES

DETAILED DESCRIPTION

An icon display controlling device and icon display controlling program according to one embodiment will be explained below.

The icon display controlling device according to one embodiment is a vehicle-mounted device, such as a car audio or navigation device. Note that the icon display controlling device is not limited to a vehicle-mounted device, but may instead be a device of another form such as a smart phone, a feature phone, a tablet terminal, a Personal Computer (PC), a Personal Digital Assistant (PDA), a Portable Navigation Device (PND), a portable game machine, or the like.

Figure 1:
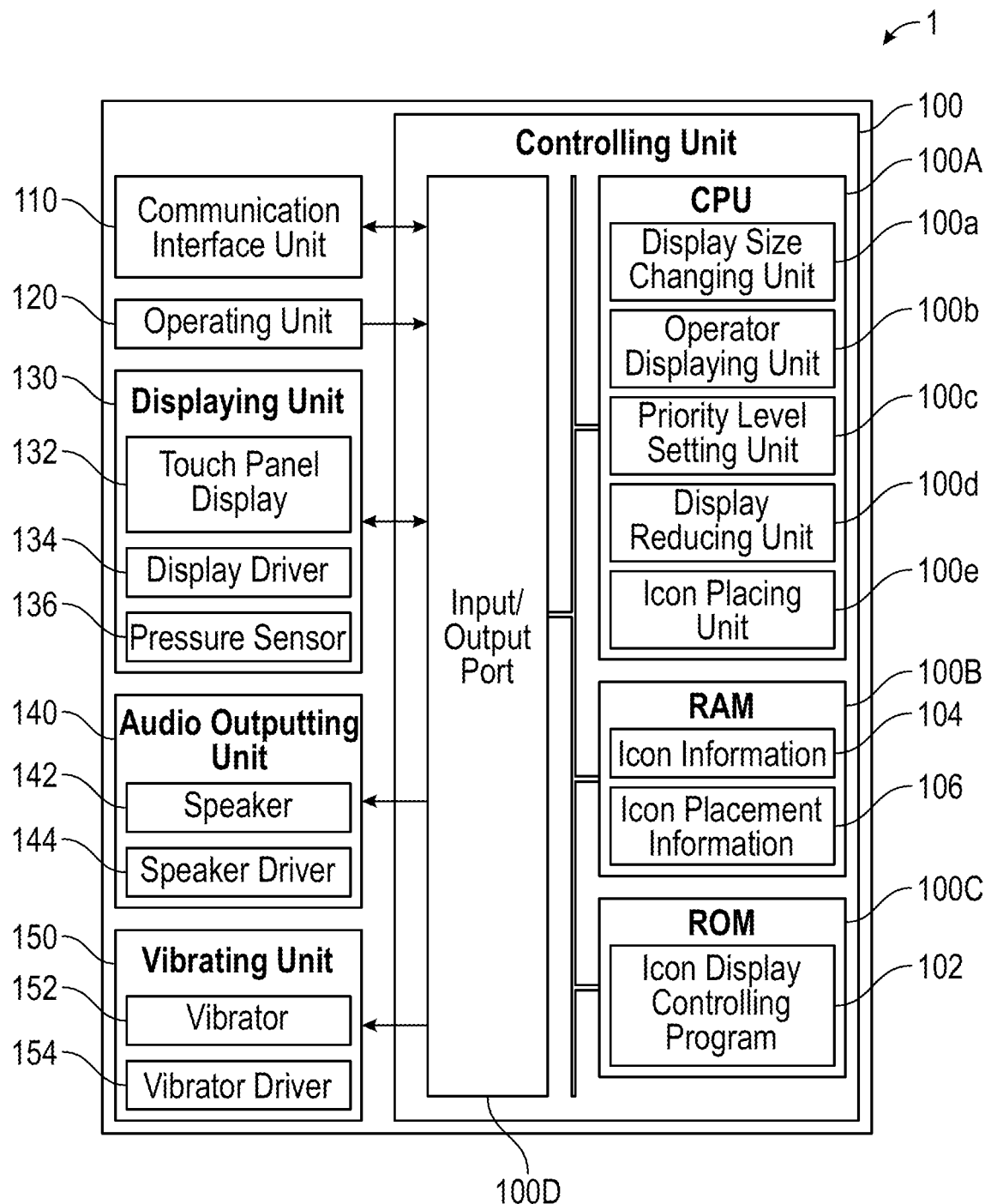
FIG. 1 is a block diagram showing a structure of an icon display controlling device according to one embodiment.

FIG. 1 is a block diagram showing the structure of an icon display controlling device 1 according to one embodiment. As shown in FIG. 1, the icon display controlling device 1 comprises a controlling unit 100, a communication interface unit 110, an operating unit 120, a displaying unit 130, an audio outputting unit 140, and a vibrating unit 150. Note that in FIG. 1 the main structural elements that are necessary for explaining the present embodiment are illustrated, where some structural elements, such as the case, for example, that are required elements in the icon display controlling device 1 are omitted arbitrarily from the illustration.

The controlling unit 100 is that which controls the entirety of the icon display controlling device 1, and is a microcomputer that is made from a Central Processing Unit (CPU) 100A, a Random Access Memory (RAM) 100B, a Read Only Memory (ROM) 100C, an input/output port 100D, bus lines connecting to these ports, and the like.

The CPU 100A reads in a program that is stored in the ROM 100C, to control the icon display controlling device 1 following the program. The CPU 100A, in terms of functional blocks, is equipped with a display size changing unit 100a, an operator displaying unit 100b, a priority level setting unit 100c, a display reducing unit 100d, and an icon placing unit 100e.

The CPU 100A, which is an example of a processor, is, for example, a single processor or a multiprocessor, and includes at least one processor. When structured including a plurality of processors, the processor 10 may be packaged as a single device, or may be structured through a plurality of physically discrete devices within the icon display controlling device 1.

The RAM 100B is a storing unit for storing programs and data temporarily, providing a work area. The RAM 100B is, for example, a Dynamic Random Access Memory (DRAM).

Icon information 104 and icon placement information 106 are stored in the RAM 100B. The icon information 104 includes icon images, display sizes, shapes, startup information for corresponding content (for example, a music player application, a radio player application, a map application, and the like), and so forth.

The ROM 100C is a nonvolatile memory for storing various types of programs and data, including the icon display controlling program 102. The ROM 100C is, for example, a flash memory. The music player application, the radio player application, and the map application, listed above by way of illustration, are stored in the ROM 100C.

The icon display controlling program 102, stored in the ROM 100C, causes the CPU 100A, which is a computer, to execute: a priority level setting step for setting priority levels, for each individual region of a plurality of regions wherein a display area in which a plurality of icons of different display sizes, including a first icon and a second icon that has a larger display size than that of the first icon, can be displayed is partitioned; a display reducing step for reducing the display size of at least one second icon that is placed in the display area, based on the priority level; and an icon placing step for placing an icon that is to be placed in a region, within the display area, that has become vacant through reducing the display size of the second icon. Executing the icon display controlling program 102 can improve the usability when adding and placing an icon in the display area. The details of the icon display controlling program 102 will be described below.

In the present embodiment, each of the functional blocks of the CPU 100A is achieved through the icon display controlling program 102, which is software. Note that some or all of the functional blocks of the CPU 100A may be achieved through hardware instead, such as dedicated logic circuits, or the like.

The input/output port 100D connects the controlling unit 100 to other structural elements (specifically, the communication interface unit 110, the operating unit 120, the displaying unit 130, the audio outputting unit 140, and the vibrating unit 150).

The communication interface unit 110 is an interface for handling processes for communicating with other terminal devices. The icon display controlling device 1 is connected so as to be able to communicate with other terminal devices through the communication interface unit 110 through a communication circuit such as a public circuit or a closed network such as a Virtual Private Network (VPN).

The operating unit 120 is an operating part for the user to operate the icon display controlling device 1, such as a button, a switch, or the like.

The displaying unit 130 has a touch panel display 132 and a display driver 134 for driving the touch panel display 132. The touch panel display 132 is structured so as to enable touch operations on the entire screen. Note that the touch panel display may be termed simply a "touch panel," or a "touch screen."

The touch panel display 132 is structured using, for example, an Liquid Crystal Display (LCD) or organic Electro Luminescence (EL) display. A resistive film system, an electrostatic capacitance system, an ultrasonic surface elastic wave system, an infrared radiation optical imaging system, or an electromagnetic induction system, for the like, is used in the touch panel display 132. A pressure sensor 136, for detecting the pressure of a touch on the screen (that is to say, on a region wherein a touch operation is possible) is built into the touch panel display 132.

The audio outputting unit 140 has a speaker 142 and a speaker driver 144 for driving the speaker 142. The speaker 142 is driven by the speaker driver 144 so as to output, from the speaker 142, a song or sound stored in the ROM 100C or on a storage medium (a Hard Disk Drive (HDD), a Solid State Drive (SSD), a removable memory card, or the like), not shown.

The vibrating unit 150 has a vibrator 152 and a vibrator driver 154 for driving the vibrator 152. The vibrator 152 is structured using, for example, an Eccentric Rolling Mass (ERM), a Linear Resonant Actuator (LRA), or a piezo element. The vibrator 152 is driven by the vibrator driver 154 to vibrate the screen of the touch panel display 132.

Figure 2A:
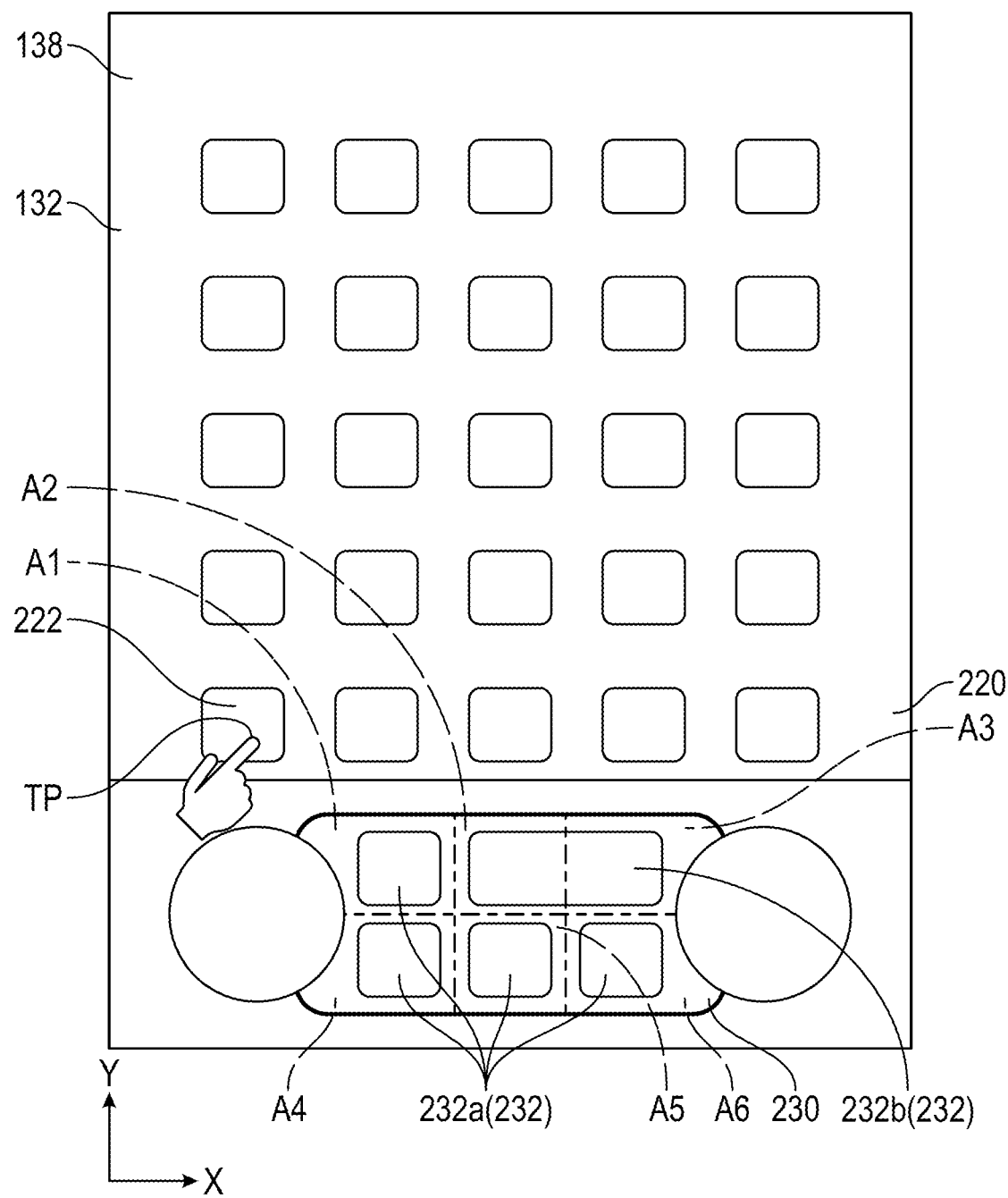
FIG. 2A is a diagram showing an example of an image that is displayed on a screen of a touch panel display in one embodiment.
Figure 2B:
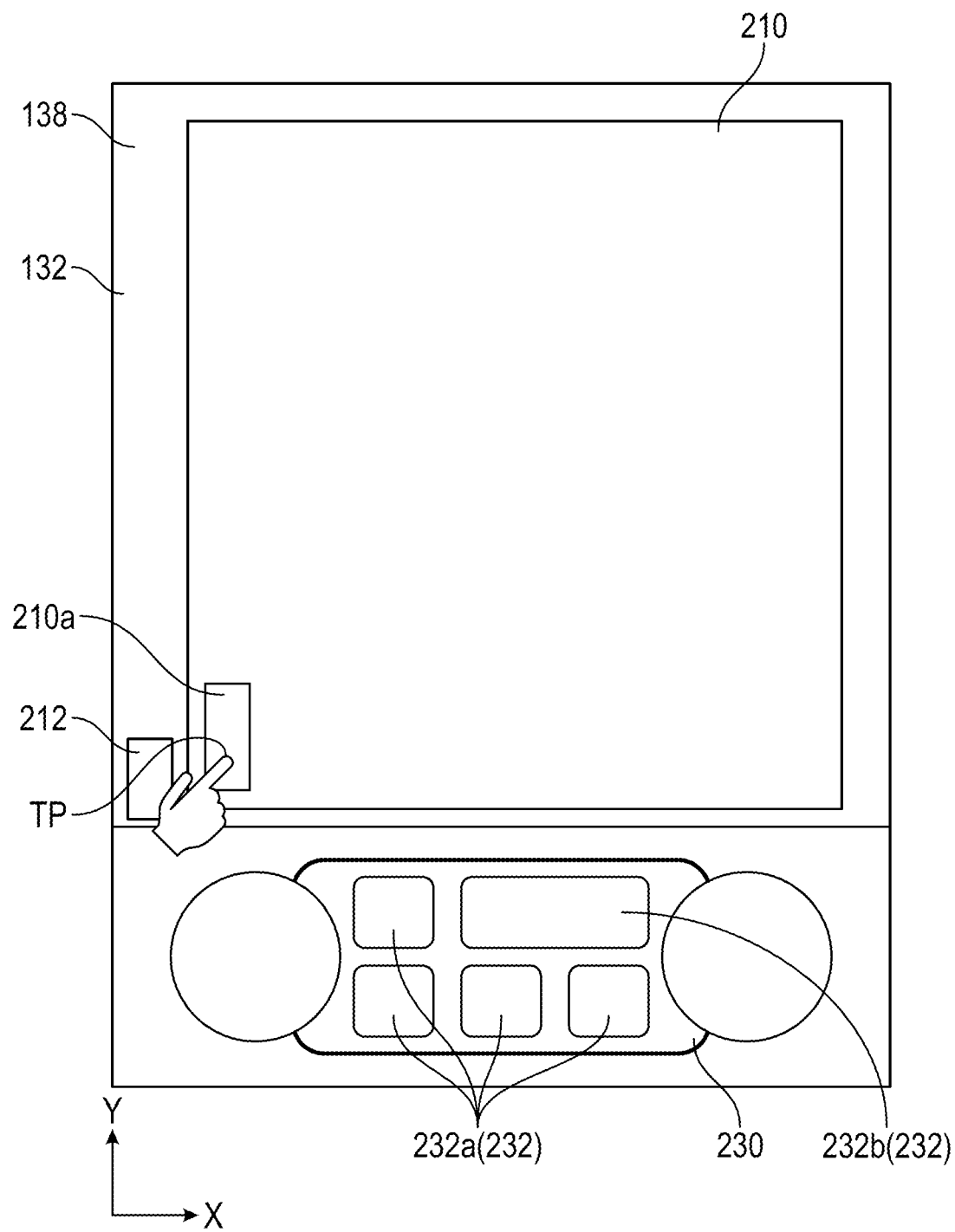
FIG. 2B is a diagram showing an example of an image that is displayed on the screen of a touch panel display in one embodiment.

FIG. 2A and FIG. 2B are diagrams showing examples of images displayed on the screen 138 of the touch panel display 132. Note that in FIG. 2A and FIG. 2B a hand icon is shown showing the state of the user touching the screen 138. The position of the fingertip on the icon is the touch position TP of the user on the screen 138. The touch position TP of the user on the screen 138 is acquired as X and the Y two-dimensional coordinate information. The horizontal direction on the screen 138 corresponds to the X direction, and the vertical direction of the screen 138 corresponds to the Y direction.

As shown in FIG. 2A, a Graphical User Interface (GUI) screen that includes the icon display area 220 and the fixed icon display area 230 is displayed on the screen 138.

Icons that correspond to various content are displayed in the icon display area 220 and the fixed icon display area 230. The user is able to cause the CPU 100A to execute content that corresponds to an icon by touching that icon in the icon display area 220 or the fixed icon display area 230. For convenience, reference symbol 222 is assigned to icons placed in the icon display area 220 and reference symbol 232 is assigned to icons placed in the fixed icon display area 230.

When the user touches an icon 222 or 232, execution of the content assigned associated with the touched icon is started, and also a window 210 is superimposed in front of the icon display area 220, as shown in FIG. 2B. An image of the content that corresponds to the icon that is touched (for example, a music player application, a radio player application, a map application, or the like) is displayed in the window 210. By way of illustration, the jacket image, title, artist name, playback position, and the like, for the music being played back, are displayed in the window 210 of the music player application. The broadcasting station name, program name, broadcast frequency, and the like, are displayed in the radio player application.

A button 212 is displayed to the side of the window 210. When the user touches the button 212, the window 210 is closed, restoring the screen 138 to the screen shown in FIG. 2A. Conversely, the screen 138 may be restored to the screen shown in FIG. 2A through the user executing a swiping operation on the window 210.

The icons 222 and 232 are of a smaller display size than that of the window 210. Because of this, the amount of information that can be displayed in the icons 222 and 232 is more limited than for the window 210. For example, with the music player application icon 222 or 232, all that is displayed is an icon image indicating that it is that application.

The display sizes of the icons 222 and 232 are set in advance by the icon display controlling program 102 based on the detail of the corresponding content, the amount of information displayed, and the like.

On the other hand, one may also consider a case wherein the user wishes to increase or decrease individually the amounts of information that can be displayed. Given this, in the present embodiment the user can set the display sizes for the icons 222 and 232 arbitrarily.

In the examples in FIG. 2A and FIG. 2B, of the five icons 232 located in the fixed icon display area 230, one icon 232*b* is set to a display size that is larger than that of the other four icons 232*a*.

For example, as opposed to only the icon image alone being displayed for the icons 232*a* of the small display size, with the icon 232*b* with the large display size, the jacket image for the music that is currently being played that is displayed in addition to the icon image. The information to be displayed by the icons 222 and 232 may be selected arbitrarily by the user.

For example, when the user operates a long push on an icon 232*a*, the icon 232*a* that has been long-pushed is changed into an icon 232*b* with a large display size. Additionally, if, for example, the user operates a long-push on an icon 232*b*, the icon 232*b* that has been long-pushed is changed into an icon 232*a* with a small display size.

A mode for changing the display size of an icon 222 or 232 may also be launched by the user pressing a predetermined button that is provided in the operating unit 120 or a predetermined button that is displayed on the screen 138. In this case, the display size of the icon 222 or 232 may be changed freely by touching and dragging an edge or a corner of the icon 222 or 232.

The CPU 100A that executes the icon display controlling program 102 operates as the display size changing unit 100*a* for changing the display size of an icon depending on an operation by the user.

Additionally, an icon 232*a* is an example of a first icon, and an icon 232*b* is an example of a second icon, with a display size larger than that of the first icon. That is, the fixed icon display area 230 is an example of a display area wherein a plurality of icons with different display sizes, including a first icon and a second icon, can be placed.

Additionally, the icon 232*b* wherein the display size is set in advance, by the icon display controlling program 102, to the display size of the second icon is an example of a second A icon. The icon 232*b* that has been changed, by the display size changing unit 100*a*, to the display size of the second icon is an example of a second B icon.

The CPU 100A that executes the icon display controlling program 102 performs control by partitioning the fixed icon display area 230 into a plurality of regions (which, for illustration, is six). For convenience, the six partitioned regions will be written as regions A1 through A6. Region A1 is a region that is positioned in the top row of the fixed icon display area 230 on the side that is furthest in the negative X direction. Region A2 is the region that is adjacent, on the positive X direction side, to the region A1, positioned in the center of the top row of the fixed icon display area 230. Region A3 is the region that is adjacent to the region A2, on the positive X direction side, positioned furthest to the positive X direction side in the top row of the fixed icon display area 230. Region A4 is a region that is positioned in the bottom row of the fixed icon display area 230 on the side that is furthest in the negative X direction. Region A5 is the region that is adjacent, on the positive X direction side, to the region A4, positioned in the center of the bottom row of the fixed icon display area 230. Region A6 is the region that is adjacent to the region A5, on the positive X direction side, positioned furthest to the positive X direction side in the bottom row of the fixed icon display area 230.

In the present embodiment, the display size of the icon 232*a* is the smallest display size for an icon 232 in the fixed icon display area 230. This display size is a display size that occupies one of the regions A1 through A6. Because of this, if they are of the minimum display size a maximum of six icons 232 can be placed in the fixed icon display area 230.

Moreover, in the present embodiment an icon 232 can be set to a display size that is an integer multiple of the minimum display size. As an example, the icon 232*b* shown in FIG. 2A is of a display size that is twice that of an icon 232*a*, and occupies two regions of regions A1 through A6.

Note that the number of icons 232, of the minimum display size, that can be placed in the fixed icon display area 230 is not limited to 6. As an example, instead seven or more icons 232 may be placed in the fixed icon display area 230. In this case, the fixed icon display area 230 would be partitioned into a number of regions depending on the number of icons that can be placed.

The icon display controlling program 102 controls the display size and shape of each icon 222 and 232 in the icon display area 220 and the fixed icon display area 230 based on the display size and shape information included in the icon information 104. When the user changes the display size or shape of an icon 222 or 232, the display size and shape information included in the icon information 104 is updated. Additionally, the icon display controlling program 102 controls the placement of each icon 222 and 232 within the icon display area 220 and the fixed icon display area 230 based on icon placement information 106.

Here, as shown in FIG. 2B, when a window 210 is displayed, the icons 222 that are placed in the icon display area 220 will no longer be visible. That is, the icons 222 cannot necessarily be seen at all times.

In contrast, the icons 232 that are placed in the fixed icon display area 230 are always visible. Because of this, typically the user places, into the fixed icon display area 230, the icons 232 that correspond to content that is used with a high frequency.

As described above, there is no limitation on the number of icons 232 that can be placed in the fixed icon display area 230. Because of this, sometimes there will be no region wherein a new icon may be placed remaining in the fixed icon display area 230. In this case, with the conventional structure, the user is forced to perform complex operations such as an operation to transit to a mode for deleting an icon, an operation for deleting an icon from the fixed icon display area 230, an operation to transit to a mode for adding a new icon, an operation for adding the new icon in the fixed icon display area 230, and the like. It is difficult for the user to carry out such complex operations in a state wherein the user has limited opportunity to view the screen 138 (such as, for example, when driving a car).

Given this, in the present embodiment, execution of the icon display controlling program 102 by the CPU 100A enables the user to add and place an icon in the fixed icon display area 230 through a simpler operation.

Figure 3:
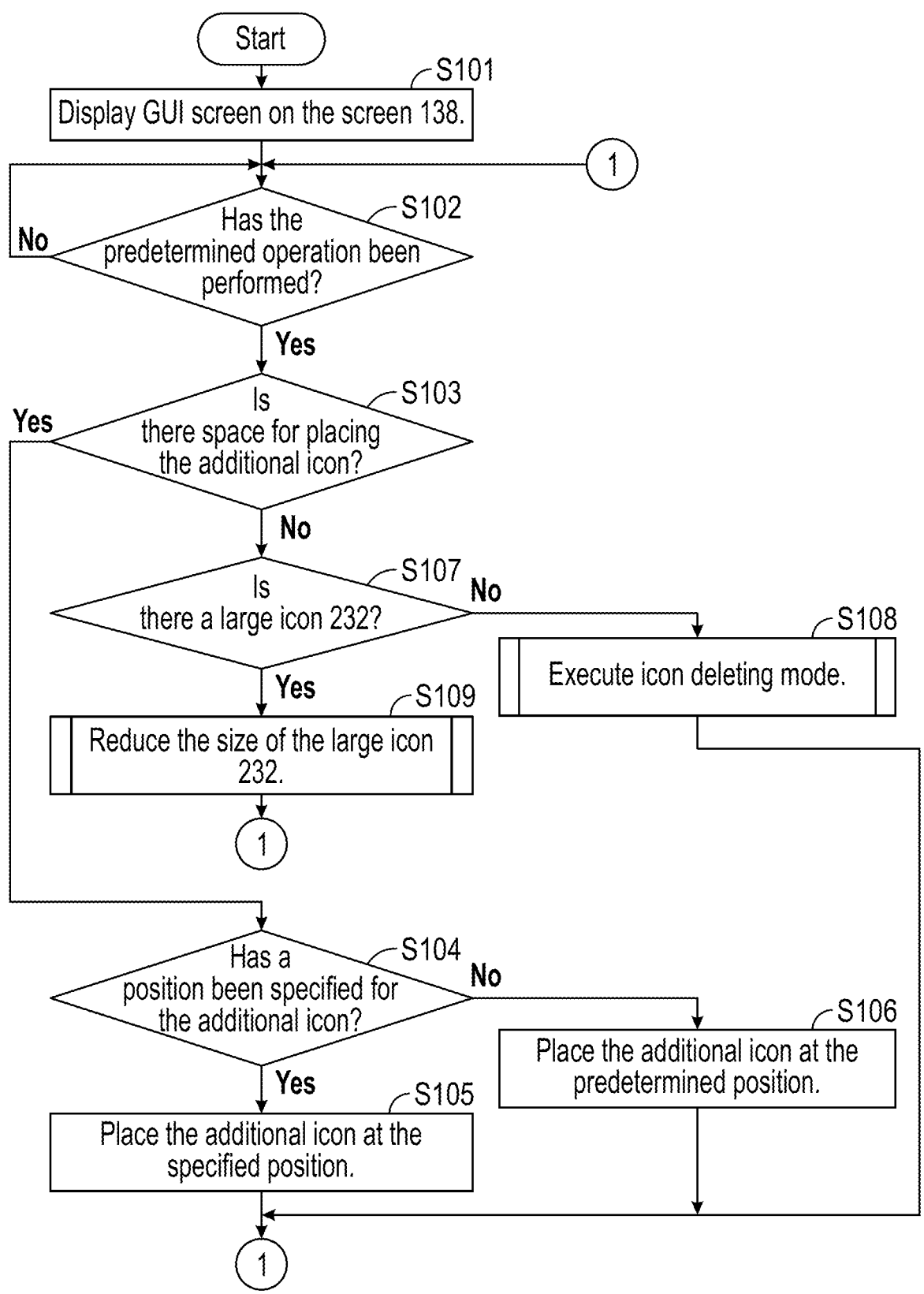
FIG. 3 is a flowchart showing a process for an icon display controlling program that is executed by a CPU in one embodiment.

FIG. 3 is a flowchart showing a process of the icon display controlling program 102 that is executed by the CPU 100A in one embodiment. For example, execution of the process in the flowchart, shown in FIG. 3, is started when the system of the icon display controlling device 1 is started up. The process in the flowchart shown in FIG. 3 is stopped when the system of the icon display controlling device 1 is stopped.

When the system of the icon display controlling device 1 is started, the icon display controlling program 102 displays a GUI screen, as illustrated in FIG. 2A, on the screen 138 (Step S101).

The icon display controlling program 102 determines whether or not to carry out a predetermined operation for adding and placing an icon in the fixed icon display area 230 (Step S102).

For example, upon detection, by a pressure sensor 136, that one icon 222 that is positioned in the icon display area 220 has been touched with a pressure of no less than a predetermined threshold value, the icon display controlling program 102 transits to a mode wherein a drag-and-drop operation can be carried out on this icon (which, for convenience, will be termed the "additional icon"). The predetermined operation, in this mode, is an operation to drag-and-drop the additional icon into the fixed icon display area 230. When the touch on the screen 138 is deleted (for example, when the user deletes a finger from the screen 138), this mode is terminated.

The predetermined operation may be an operation wherein a bookmark button 210a of a window 210 that displays content that corresponds to the additional icon is touched.

The bookmark button 210a is an example of an operator that is assigned corresponding to an additional icon. That is, an example of the predetermined operation is a user operation on an operator.

The CPU 100A that executes the icon display controlling program 102 operates as the operator displaying unit 100b for displaying the operator that is assigned corresponding to an icon.

When the predetermined operation, described above, is performed (Step S102: YES), the icon display controlling program 102 determines whether or not there is, within the fixed icon display area 230, a region in which the additional icon can be placed (Step S103). In other words, the icon display controlling program 102 determines whether or not there is, among the regions A1 through A6, a region wherein no icon 232 is located.

Note that the number of regions required for placement will vary depending on the display size of the additional icon. Because of this, in Step S103, the determination takes into account the display size of the additional icon as well. For example, if the additional icon is of the minimum size, the icon display controlling program 102 determines whether or not there is, among the regions A1 through A6, a single region wherein no icon 232 is located. If, for example, the additional icon is twice the minimum display size, the icon display controlling program 102 determines whether or not there are, among the regions A1 through A6, two regions where no icon 232 is located.

If, within the fixed icon display area 230, there is a region wherein an additional icon can be placed (Step S103: YES), the icon display controlling program 102 determines whether or not a position has been specified in the fixed icon display area 230 for the additional icon (Step S104).

If a position has been specified in the fixed icon display area 230 for the additional icon (Step S104: YES), the icon display controlling program 102 places the additional icon in the specified position (Step S105).

For example, the specified position is the drop position, in the fixed icon display area 230, of the additional icon that has been dragged from the icon display area 220 (that is, the position at which the user deleted the finger from the screen 138).

If no position has been specified, in the fixed icon display area 230, for the additional icon (Step S104: NO), the icon display controlling program 102 places the additional icon, at a predetermined position within the fixed icon display area 230 (Step S106).

For example, if the bookmark button 210a has been touched, the icon display controlling program 102 determines that no position has been specified for the additional icon.

The "predetermined position" indicates the region, among regions A1 through A6 wherein no icon 232 is placed, that is closest to the region A1. If no icon 232 is placed in the region A1, then the region A1 would be the predetermined region. Among regions A2 through A6, region A2 indicates the region that is nearest to the region A1, and region A6 indicates the region that is furthest from the region A1. That is, the smaller the number following "region A," the nearer that region is to region A1.

After the processes in Step S105 and S106, the icon display controlling program 102 returns to the process of Step S102, and stands by for inputting of the predetermined operation.

If, in the fixed icon display area 230, there is no region wherein the additional icon can be placed (Step S103: NO), the icon display controlling program 102 determines whether or not there is an icon 232 that is displayed with a size that is no less than twice the minimum display size (Step S107). For convenience, an icon 232 that is displayed with a size of no less than twice the minimum display size shall be termed a "large icon 232." In the example in FIG. 2A, the icon 232b would be a "large icon 232."

If there is no large icon 232 (Step S107: NO), the icon display controlling program 102 transits to the icon deleting mode, making it possible to delete an icon 232, and executes the icon deleting mode (Step S108).

Figure 4:
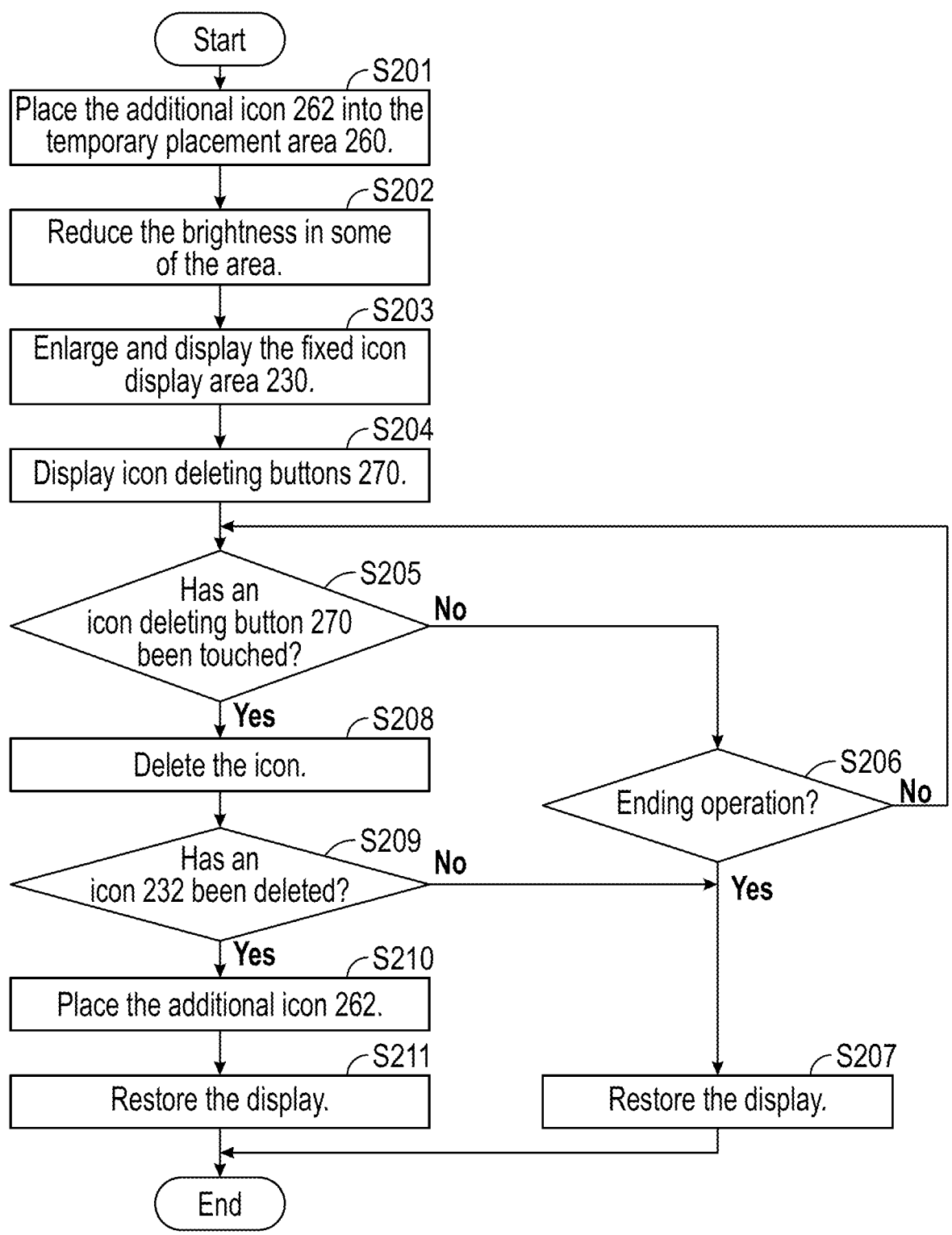
FIG. 4 is a diagram showing a subroutine of Step S108 in FIG. 3.
Figure 5:
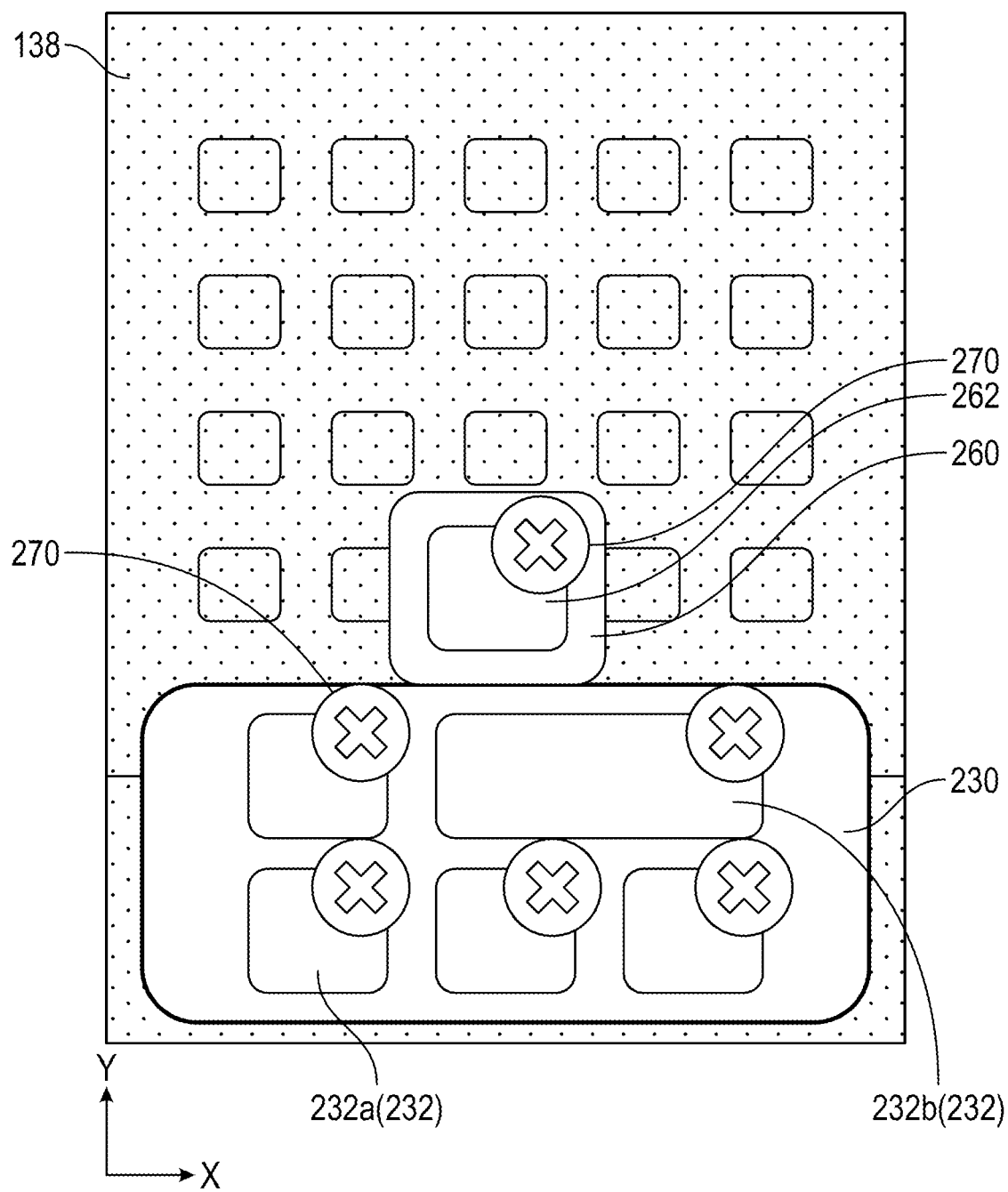
FIG. 5 is a diagram showing an example of an image that is displayed on a screen when in the icon deleting mode in one embodiment.

FIG. 4 is a diagram showing the subroutine of Step S108 in FIG. 3. FIG. 5 is a diagram showing an example of an image that is displayed on the screen 138 in the icon deleting mode.

As shown in FIG. 4, the icon display controlling program 102 displays a temporary placement area 260 at a position adjacent to the fixed icon display area 230, and the additional icon is placed into the displayed temporary placement area 260 (Step S201). In the below, reference symbol 262 will be assigned to the additional icon.

In the present embodiment, in the icon deleting mode not only the icons 232 but also the additional icon 262 are set as the deletion object. In order to facilitate inclusion, in the field of view of the user, all of the icons that are the deletion object, the temporary placement area 260 is displayed at a position that is adjacent to the fixed icon display area 230, and the additional icon 262 is placed in the temporary placement area 260.

The icon display controlling program 102 displays, with a brightness that is less than that of the fixed icon display area 230 and the temporary placement area 260, the areas in the screen 138 other than the fixed icon display area 230 and the temporary placement area 260 (Step S202).

As an example, the icon display controlling program 102 displays the fixed icon display area 230 with the same brightness as before the deleting mode transition, on the other hand the brightness of areas other than the fixed icon display area 230 and the temporary placement area 260 is reduced when compared to that of prior to transiting to the icon deleting mode. Through this, the brightness of the areas other than the fixed icon display area 230 and the temporary placement area 260 will be less than that of the fixed icon display area 230 and the temporary placement area 260.

Because of this, in the screen 138, the fixed icon display area 230 and the temporary placement area 260 will be displayed more brightly, the user will be able to recognize easily the icons 232 in the fixed icon display area 230 and the additional icon 262 in the temporary placement area 260.

The icon display controlling program 102 displays the fixed icon display area 230 in a larger size than before transiting to the deleting mode (Step S203).

Enlarging the display of the fixed icon display area 230 causes the display sizes of the icons 232 to be larger, and increases the spacing between the icons 232. Because of this, when in the icon deleting mode this reduces the likelihood that the user will mistakenly touch an icon 232 other than the icon 232 that is to be deleted.

The icon display controlling program 102 displays icon deleting buttons 270 superimposed on the icons 232 in the fixed icon display area 230 and on the additional icon 262 in the temporary placement area 260 (Step S204). Through this, an image as illustrated in FIG. 5 will be displayed on the screen 138. The respective icon deleting buttons 270 that are displayed on each individual icon, of the icons 232 and the additional icon 262 have correspondence assigned thereto. The user can touch an icon deleting button 270 to the icon 232 or the additional icon 262 that corresponds to the icon deleting button 270 that is touched.

Whether or not a user has touched an icon deleting button 270 is determined (Step S205).

If no icon deleting button 270 has been touched (Step S205: NO), the icon display controlling program 102 determines whether or not an ending operation has been carried out for the icon deleting mode (Step S206). The ending operation is, for example, an operation that is a long-push on the low-brightness area that is other than the fixed icon display area 230 and the temporary placement area 260, or an operation wherein a low-brightness area is pressed firmly.

When an ending operation is performed for the icon deleting mode (Step S206: YES), the icon display controlling program 102 restores the screen 138 to the display just before transiting to the icon deleting mode (Step S207), ending the icon deleting mode. The icon display controlling program 102 returns to the process in Step S102, and stands by for inputting of the predetermined operation. In this case, the icon deleting mode is ended without deleting any of the icons 232. This could be restated as the additional icon 262 is deleted from the temporary placement area 260, and the icon deleting mode is ended.

When an icon deleting button 270 is touched (Step S205: YES), the icon display controlling program 102 deletes the icon 232, or the additional icon 262 that corresponds to the icon deleting button 270 that has been touched (Step S208).

When an icon 232 has been deleted (Step S209: YES), the icon display controlling program 102 places the additional icon 262 into the region in the fixed icon display area 230 that has been vacated by deleting the icon 232 (Step S210). The icon display controlling program 102 restores the screen 138 to the display just before transiting to the icon deleting mode (that is, the display after placement of the additional icon 262 into the fixed icon display area 230) (Step S211), and the icon deleting mode is ended. The icon display controlling program 102 returns to the process in Step S102, and stands by for inputting the predetermined operation.

Note that the number of regions required for placement varies depending on the display size of the additional icon 262. For example, if only a single 232 is deleted, there may be insufficient area for placing the additional icon 262. In this case, the icon display controlling program 102 places the additional icon 262 at a stage when 2 or more icons 232 are deleted and a sufficient area becomes available.

For a large icon 232 (Step S107: YES), the icon display controlling program 102 will transit to a size reducing mode, and will execute the size reducing mode (Step S109).

The icon display controlling program 102 may cause audio indicating the transition into the size reducing mode to be outputted from a speaker 142. Additionally, the icon display controlling program 102 may notify the user that the mode has transited to the size reducing mode, doing so through driving the vibrator 152 to vibrate the screen 138 in a predetermined pattern.

Figure 6:
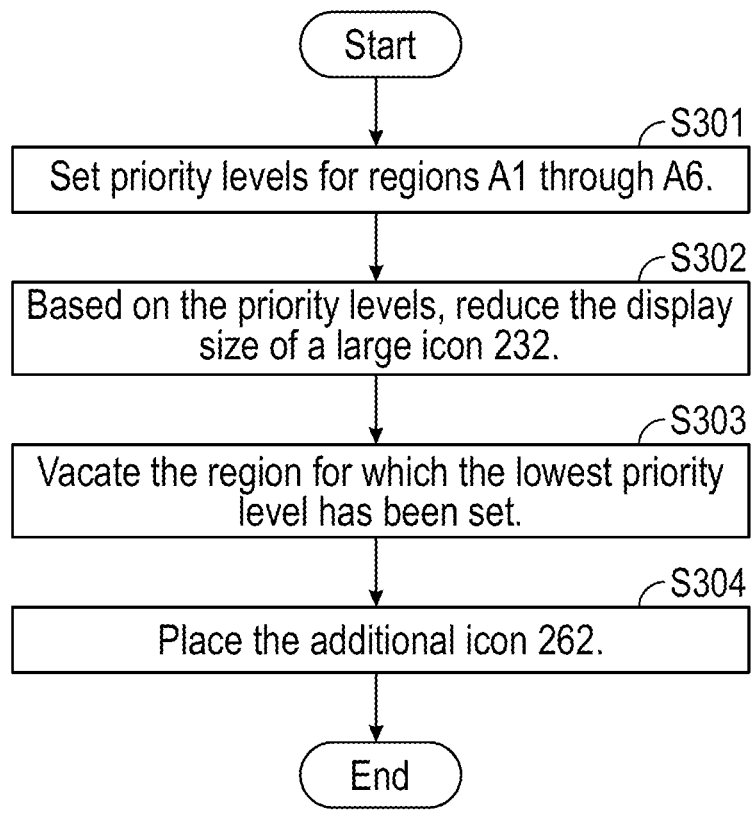
FIG. 6 is a diagram showing a subroutine of Step S109 of FIG. 3.

FIG. 6 is a diagram showing a subroutine in Step S109 of FIG. 3. FIG. 7A through FIG. 7D are diagrams showing example placements for icons in the fixed icon display area 230 when in the size reducing mode. In the example in FIG. 7A, icons 232b, which are large icons 232, are placed in regions A1 and A2, and icons 232a, of the small display size, are placed in regions A3 and A6, and icon 232b, which is a large icon 232, is placed in regions A4 and A5.

As shown in FIG. 6, the icon display controlling program 102 sets priority levels for regions A1 through A6 (Step S301).

A specific example of setting priority levels for regions A1 through A6 will be explained. For example, the user may set in advance, prior to transiting to the size reducing mode, or set after transiting to the size reducing mode, any of the regions A1 through A6 as a position for placing the additional icon 262.

When a position for the additional icon 262 has been specified, the icon display controlling program 102 sets the priority levels for each of the regions A1 through A6 based on the specified position. For example, if region A1 is the specified position, then the icon display controlling program 102 sets the region A1 to the lowest priority level of the regions A1 through A6. For regions A2 through A6, the closer the region is to region A1, the lower the priority is set. As an example, lower priorities are set for regions A2, A4, A5, A3, and A6, in that order. As another example, if region A6 is the specified position, the icon display controlling program 102 sets the priority level to be lowest in regions A6 among the regions A1 through A6. For regions A1 through A5, the closer the region is to region A6, the lower the priority is set. As an example, lower priority levels are set for regions A5, A3, A2, A4, and A1, in that order.

If no position has been specified for the additional icon 262 the icon display controlling program 102 sets predetermined priority levels for each region A1 through A6. As an example, the icon display controlling program 102 sets lower priority levels for regions A1, A2, A3, A4, A5, and A6, in that order.

In this way, the CPU 100A that executes the icon display controlling program 102 operates as the priority level setting unit 100c for setting the priority levels for each of the plurality of regions A1 through A6 that are partitioned within the fixed icon display area 230.

The icon display controlling program 102 reduces the display size of a large icon 232 based on the priority level set in Step S301 (Step S302). Specifically, the icon display controlling program 102 reduces the display size of a large icon 232 that is placed in a region wherein a lower priority level is set.

Figure 7A:
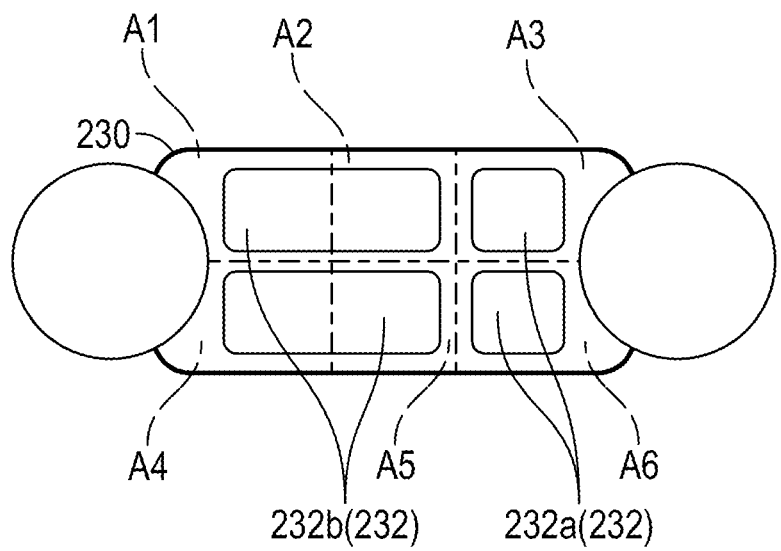
FIG. 7A is a diagram showing an example layout of icons in a fixed icon display area when in the size reducing mode in one embodiment.
Figure 7B:
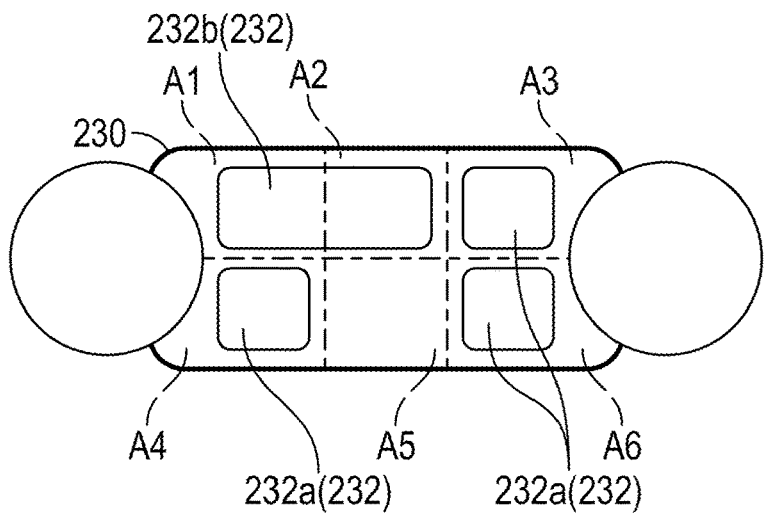
FIG. 7B is a diagram showing an example layout of icons in a fixed icon display area when in the size reducing mode in one embodiment.

In the examples in FIG. 7A to FIG. 7D, let us assume that low priority levels are set in region A6, A5, A3, A2, A4, and A1, in that order. Additionally, let us assume that the display size of the additional icon 262 is of the minimum display size. In this case, the icon display controlling program 102 reduces, to the minimum display size, the display size of the icon 232*b* that is located in regions A4 and A5 (which includes the region A5 that is set to a lower priority level) rather that the icon 232*b* that is located in regions A1 and A2, as shown in FIG. 7B. More specifically, the display size of the icon 232*b* is reduced so as to vacate region A5, which is set to the lower priority level among region A4 and region A5. Through this, a region enabling placement of the additional icon 262 is secured in the fixed icon display area 230.

In this way, the CPU 100A that executes the icon display controlling program 102, when carrying out the predetermined operation for adding and placing the icon into the fixed icon display area 230, operates as a display reducing unit 100*d* for reducing the display size of at least one large icon (an example of a second icon) that is placed in the fixed icon display area 230.

Figure 7C:
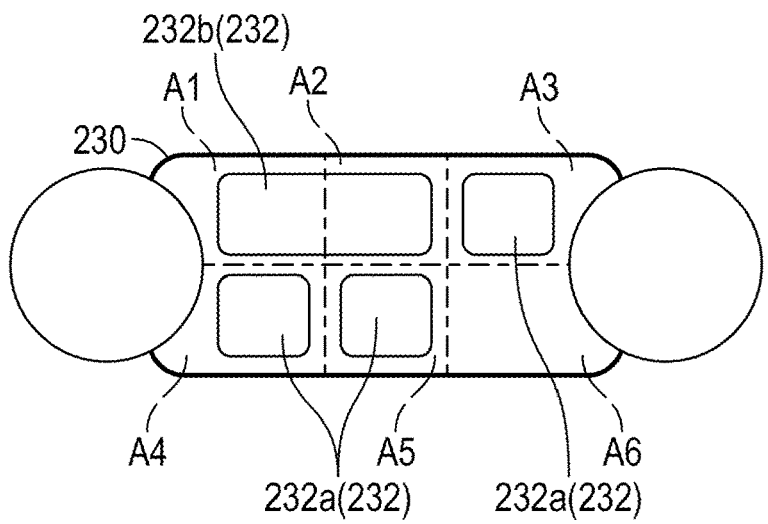
FIG. 7C is a diagram showing an example layout of icons in a fixed icon display area when in the size reducing mode in one embodiment.
Figure 7D:
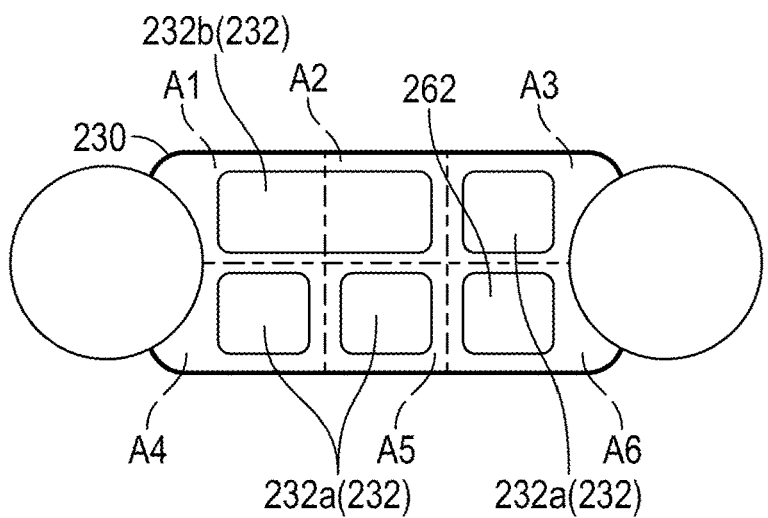
FIG. 7D is a diagram showing an example layout of icons in a fixed icon display area when in the size reducing mode in one embodiment.

The icon display controlling program 102 vacates the region that is set to the lowest priority level (Step S303). As shown in FIG. 7C, the icon display controlling program 102 shifts, to the region A5, the icon 232*a* that had been located in region A6, so as to vacate the region A6, which is set to the lowest priority level.

Note that when the additional icon 262 is of a display size that is twice the minimum display size it will be necessary to vacate two regions. In this case, in Step S302, both the icon 232*b* that is located in the regions A1 and by A2 and the icon 232*b* that is located in the regions A4 and by A5 will be reduced. The former of these icons 232*b* is reduced to a display size so as to vacate the region A2, which, of the regions A1 at A2, is the one with the lower priority level. The latter of these icons 232*b* is reduced to a display size so as to vacate the region A5, which, of the regions A4 at A5, is the one with the lower priority level. In Step S303, the icon display controlling program 102 shifts the icons 232*a* that had been located in regions A3, A4, and A6 so as to vacate regions A5 and A6, which includes region A6 that is set to the lowest priority level.

The icon display controlling program 102 places, into the region vacated in Step S303, the additional icon 262 (Step S304). In the example in FIG. 7D, the icon display controlling program 102 places the additional icon 262 into the region A6 that is set to the lowest priority level (in other words, the position that is specified by the user or the position that is determined if no position has been specified by the user).

In this way, the CPU 100A that executes the icon display controlling program 102 operates as the icon placing unit 100*e* that places the additional icon 262 into the region of the fixed icon display area 230 that has been vacated through reducing the display size of a large icon (an example of a second icon).

In the present embodiment, the additional icon 262 to the fixed icon display area 230, can be added and placed by the user merely carrying out a predetermined operation (for example, a drag-and-drop operation on the additional icon 262 or an operation of touching a bookmark button 210*a*). That is, this improves the usability, when adding and placing such an icon, when compared to the conventional icon display controlling device.

An exemplary embodiment of the present disclosure has been explained above. Embodiments of the present disclosure are not limited to that which was explained above, and may be modified in a variety of ways within the range of the technical concept of the present disclosure. For example, details of arbitrary combinations of embodiments, or the like, explicitly disclosed by way of illustration in the specification, and embodiments, or the like, that are obvious are also included as embodiments of the present application.

While in the embodiment above the display size of a large icon 232 was reduced based on the priority levels set for regions A1 through A6, in another embodiment the display size of the large icons 232 may be reduced based on priority levels set for the large icons.

That is, the CPU 100A that operates as the priority level setting unit 100*c* also sets priority levels for large icons (examples of second icons) that are placed in the fixed icon display area 230.

Various methods may be considered for setting priority levels for the large icons, but here an example of a method will be explained using FIG. 7A. Let us consider a case wherein, in the example in FIG. 7A, the icon 232*b* located in the regions A1 and A2 has been set in advance as a large icon by the icon display controlling program 102 (as an example of a second A icon), and the icon 232*b* located in regions A4 and by A5 has been changed, by a user operation, to a large icon (an example of a second B icon). In this case, the icon display controlling program 102 sets the priority level of the former icon (the example of the second A icon) to be lower than the priority level of the latter icon (the example of a second B icon) so that the former icon will be reduced prioritized over the latter icon.

The latter icon (the example of the second B icon) has had the display size thereof enlarged intentionally by the user. Because of this, the user would prefer the display size, after enlarging, to be maintained. Given this, the icon display controlling program 102 sets a high priority level for the latter icon.

The icon display controlling program 102 performs control through assigning scores for the priority levels set for the regions A1 through A6 and the priority levels set for the large icons. As an example, scores of 10, 8, 6, 4, 2, and 0 are assigned sequentially to the regions that are set to the lower priority levels. Moreover, a score of 10 is assigned to the former icon (the example of the second A icon), and a score of 0 is assigned to the latter icon (the example of the second B icon). In Step S302, the icon display controlling program 102 reduces the display size of the large icon with the highest total value for both scores.

In the example in FIG. 7A, scores of 0, 4, 2, and 8 are assigned, respectively, to regions A1, A2, A4, and A5. A score of 10 is assigned to the icon 232*b* that is located in regions A1 and by A2, and a score of 0 is assigned to the icon 232*b* that is located in regions A4 and by A5. The total value for the score for the icon 232*b* that is located in regions A1 and A2 is 14, and the total value for the score for the icon 232*b* that is located in regions A4 and A5 is 10. Because of this, in this example the display size of the icon 232*b* that is located in regions A1 and by A2 will be reduced.

In another embodiment, the icon display controlling program 102 may display in reduced brightness, when compared to the fixed icon display area 230, the areas, in the screen 138, other than the fixed icon display area 230 when in the icon size reducing mode. Because, in the screen 138, the fixed icon display area 230 will be displayed most brightly, the user will be able to recognize easily the process wherein the additional icon 262 is placed in the fixed icon display area 230.

Moreover, in another embodiment, the icon display controlling program 102 may display the fixed icon display area 230 larger during the icon size reducing mode than the size prior to transiting into the icon size reducing mode. Enlarging the display of the fixed icon display area 230 makes it easier for the user to recognize the process wherein the additional icon 262 is placed in the fixed icon display area 230.

EXPLANATION OF REFERENCE NUMERALS

1: Icon Display Controlling Device
10: Processor
100: Controlling Unit
100A: CPU
100B: RAM
100C: ROM
100D: Input/Output Port
100a: Display Size Changing Unit
100b: Operator Displaying Unit
100c: Priority Level Setting Unit
100d: Display Reducing Unit
100e: Icon Placing Unit
102: Icon Display Controlling Program
110: Communication Interface Unit
120: Operating Unit
130: Displaying Unit
140: Audio Outputting Unit
150: Vibrating Unit

What is claimed is:

1. An icon display controlling device comprising:
a priority level setting unit that sets priority levels for each of a plurality of regions partitioned within a display area that can display a plurality of icons each having a display size, the plurality of icons including a first icon having a first display size and a second icon having a second display size that is larger than the first display size of the first icon, the priority level setting unit setting a priority level for the second icon that is located in the display area;
a display reducing unit that reduces the second display size of the second icon that is located in the display area, based on both (a) at least one of the priority levels for the regions and (b) the priority level for the second icon; and
an icon placing unit that places an additional icon into a vacated region of the plurality of regions within the display area that has been vacated through reducing the display size of the second icon.

2. The icon display controlling device of claim 1, further comprising:
a display size changing unit that changes the display size of at least one of the icons in response to at least one operation by a user, wherein:
the plurality of icons includes a third icon having a third display size that is larger than the first display size of the first icon;
the priority level setting unit sets the priority level for the second icon to be lower than a priority level of the third icon in response to a determination that (a) the second display size of the second icon has been set in advance and (b) the third display size of the third icon has been changed through the display size changing unit; and
the display reducing unit reduces the second display size of the second icon with priority over the third icon based on the priority level for the second icon being lower than the priority level for the third icon.

3. The icon display controlling device of claim 1, wherein:
in response to a predetermined operation being performed for placing the additional icon within the display area, the display reducing unit reduces the second display size of the second icon and the icon placing unit places the additional icon.

4. The icon display controlling device of claim 3, further comprising:
an operator displaying unit that displays an operator that is assigned corresponding to the additional icon, wherein:
the predetermined operation is a user operation on the operator.

5. A non-transitory computer-readable medium including instructions stored thereon that, when executed by at least one processor, cause the at least one processor to perform operations comprising:
a priority level setting step for (a) setting priority levels for each of a plurality of regions partitioned within a display area that can display a plurality of icons each having a display size, the plurality of icons including a first icon having a first display size and a second icon having a second display size that is larger than the first display size, and (b) setting a priority level for the second icon that is located in the display area;
a display reducing step for reducing the second display size of the second icon that is located in the display area, based on both (a) at least one of the priority levels for the regions and (b) the priority level for the second icon; and
an icon placing step for placing an additional icon into a vacated region of the plurality of regions within the display area that has been vacated through reducing the display size of the second icon.

6. An icon display controlling device comprising:
a priority level setting unit that sets priority levels for each of a plurality of regions partitioned within a display area that can display a plurality of icons each having a display size, the plurality of icons including a first icon having a first display size and a second icon having a second display size that is larger than the first display size of the first icon;
an operator displaying unit that displays an operator that is assigned corresponding to an additional icon, the operator being configured to receive a user operation for placing the additional icon within the display area;
a display reducing unit that, in response to the user operation on the operator, reduces the second display size of the second icon that is located in the display area, based on at least one of the priority levels; and
an icon placing unit that, in response to the user operation on the operator, places the additional icon into a vacated region of the plurality of regions within the display area that has been vacated through reducing the display size of the second icon.

* * * * *